United States Patent
Jones et al.

(10) Patent No.: US 9,349,011 B2
(45) Date of Patent: May 24, 2016

(54) METHODS AND APPARATUS TO IDENTIFY A DEGRADATION OF INTEGRITY OF A PROCESS CONTROL SYSTEM

(75) Inventors: Aaron C. Jones, Austin, TX (US); Robert B. Havekost, Elgin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 563 days.

(21) Appl. No.: 13/472,916

(22) Filed: May 16, 2012

(65) Prior Publication Data

US 2013/0307690 A1    Nov. 21, 2013

(51) Int. Cl.
G06F 21/57    (2013.01)
G06F 21/64    (2013.01)

(52) U.S. Cl.
CPC .............. *G06F 21/577* (2013.01); *G06F 21/64* (2013.01)

(58) Field of Classification Search
CPC ........ G06F 21/577; G06F 21/64; G05B 23/02
USPC .......................................................... 713/187
See application file for complete search history.

(56) References Cited

U.S. PATENT DOCUMENTS

| | | |
|---|---|---|
| 5,987,611 A | 11/1999 | Freund |
| 6,694,434 B1 | 2/2004 | McGee et al. |
| 7,003,672 B2 | 2/2006 | Angelo et al. |
| 7,950,056 B1 | 5/2011 | Satish et al. |
| 2002/0116637 A1* | 8/2002 | Deitsch et al. ................. 713/201 |
| 2002/0120426 A1* | 8/2002 | Sasaki et al. .................. 702/183 |
| 2002/0163427 A1* | 11/2002 | Eryurek et al. ............... 340/500 |
| 2004/0039921 A1* | 2/2004 | Chuang ........................... 713/187 |
| 2004/0123137 A1* | 6/2004 | Yodaiken ................ G06F 21/55 726/22 |
| 2004/0128515 A1* | 7/2004 | Rabin et al. .................... 713/176 |
| 2005/0251858 A1* | 11/2005 | DelRegno et al. ............... 726/22 |
| 2006/0004737 A1* | 1/2006 | Grzonka .......................... 707/4 |
| 2006/0031673 A1 | 2/2006 | Beck et al. |
| 2006/0230451 A1* | 10/2006 | Kramer et al. .................. 726/22 |
| 2007/0150948 A1* | 6/2007 | De Spiegeleer ................. 726/22 |
| 2008/0155509 A1* | 6/2008 | Ohta et al. ..................... 717/127 |
| 2011/0039237 A1* | 2/2011 | Skare ................. G05B 23/0267 434/118 |
| 2012/0030761 A1* | 2/2012 | Baba et al. ........................ 726/23 |
| 2013/0318607 A1* | 11/2013 | Reed ................... G06F 11/3062 726/23 |

FOREIGN PATENT DOCUMENTS

| | | |
|---|---|---|
| WO | 0233525 A2 | 4/2002 |
| WO | 2006047163 A2 | 5/2006 |
| WO | 2012015485 A1 | 2/2012 |

OTHER PUBLICATIONS

Coutinho et al., Anomaly Detection in Power System Control Center Critical Infrastructures using Rough Classification Algorithm, Jun. 2009, 3rd IEEE International Conference on Digital Ecosystems and Technologies, pp. 733-738.*

UK Intellectual Property Office, "Search Report", issued in connection with corresponding Great Britain Patent Application No. GB1308469.4 on Oct. 29, 2013 (2 pages).

* cited by examiner

*Primary Examiner* — Kenneth Chang
(74) *Attorney, Agent, or Firm* — Hanley, Flight & Zimmerman, LLC

(57) ABSTRACT

Methods and apparatus to identify a degradation of integrity of a process control system are disclosed. An example method includes identifying a file on a file system of the process control system. The example method further includes determining if the file is identified in a system profile, the system profile identifying files expected to be present. A degradation of integrity of the process control system is identified when the file is not identified in the system profile.

21 Claims, 7 Drawing Sheets

US 9,349,011 B2

METHODS AND APPARATUS TO IDENTIFY A DEGRADATION OF INTEGRITY OF A PROCESS CONTROL SYSTEM

FIELD OF THE DISCLOSURE

This disclosure relates generally to process control systems and, more particularly, to methods and apparatus to identify a degradation of integrity of a process control system.

BACKGROUND

Security breaches are a continuous threat to computing systems such as process control systems (e.g., power plants, oil refineries, chemical facilities, etc.). A security breach of a process control system may have disastrous effects. To prevent such a security breach, process control systems are intentionally isolated from outside communications. A process control system typically includes all components needed to perform day-to-day operations of the system and does not communicate with outside systems.

However, some information associated with and/or generated by the process control system may need to be shared outside of the process control system such as, for example, alerts, errors messages, warning messages, etc. A common technique for sharing information outside of a process control system involves an electronic communication system such as, for example, the Internet. However, communicating via such an electronic communication system may create security vulnerabilities within the process control system.

SUMMARY

Figure 1:
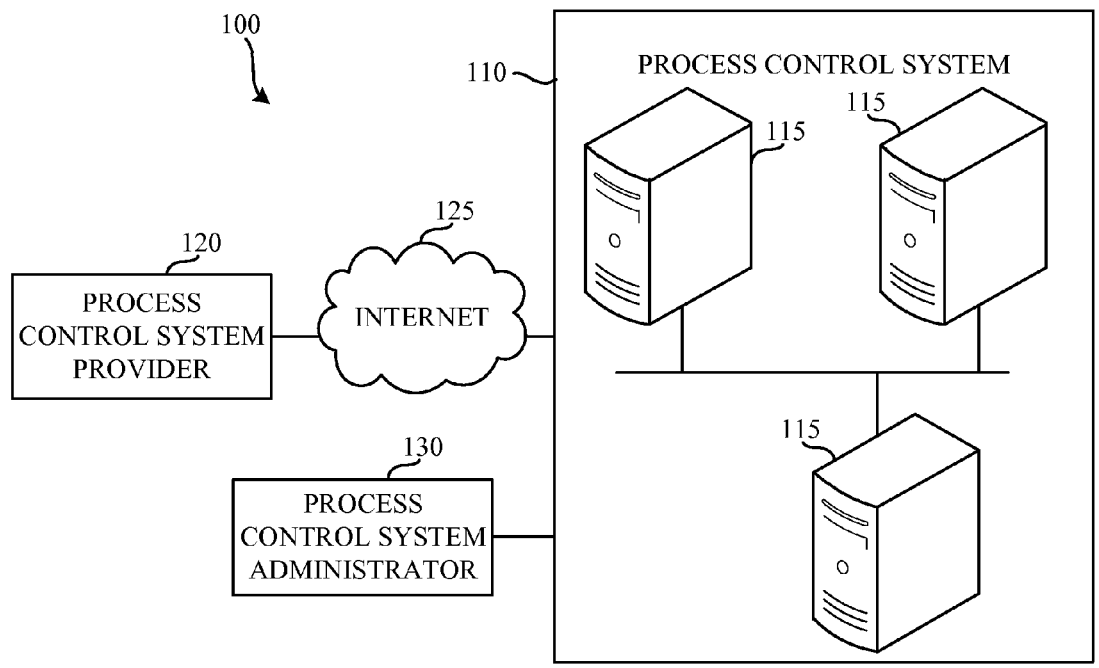
FIG. 1 is a block diagram of an example process control system including process control nodes.

An example method of identifying a degradation of integrity of a process control system includes identifying a file on a file system of the process control system. It is then determined if the file is identified in a system profile. The system profile identifies files expected to be present on the file system. A degradation of integrity of the process control system is identified when the file is not identified in the system profile.

An example apparatus to identify a degradation of integrity of a process control system includes a file system verifier to identify a difference between a property of a file stored on a file system of a process control node and a first stored value as a degradation of integrity. The example system further includes an active process verifier to identify a difference between a property of an active process executed by the process control node and a second stored value as the degradation of integrity.

DETAILED DESCRIPTION

A security breach of a process control system may allow modifications to a process control system that are malicious toward the customer (e.g., the operator of the process control system) and/or toward the producer (e.g., a supplier of the process control system) of the process control system. Modifications that affect the customer may include taking control of a process control system, gaining access to confidential information and/or settings of the process control system, disabling the process control system, etc. Modifications that affect the producer of the process control system may include gaining access to a feature that a customer may otherwise need to pay for, etc.

To address security breaches, the example methods and apparatus described herein include an integrity guard in one or more process control nodes within a process control system. The example integrity guard monitors and verifies the integrity of the process control node and, thereby, the process control system. The integrity of the process control node is monitored in a number of ways. For example, the integrity guard monitors and verifies a file system of the process control node, the integrity guard monitors and verifies network communications of the process control node, and/or the integrity guard monitors and verifies active processes of the process control node.

In consumer systems (e.g., personal computers), antivirus systems are used to detect system problems. Antivirus systems use definitions of known problems such as, for example, signatures and/or definitions of known malicious application(s), etc. Antivirus systems then identify problems by positively matching applications and/or files on the system with the definitions. That is, anything that matches a definition is considered a problem. In contrast, the integrity guard of the examples illustrated below identify degradations in integrity of the process control node and/or process control system by negatively identifying file system irregularities, network communication irregularities, and/or active process irregularities. That is, anything that does not match a definition is considered an irregularity and/or problem.

In the examples described herein, a signature includes one or more identifying features (e.g., a size, an update date, contents of, etc.) of a file, application, process, etc. that enables the integrity guard to identify the file, application, process, etc.

Upon detection of a degradation of integrity of the process control system, the integrity guard may send an alert to an administrator of the process control system and/or a provider of the process control system. As described herein, the administrator may be any person and/or group of people associated with and/or otherwise concerned with the process control system. For example, the administrator of the process control system may be an operator, an installer, a manager, a user, an owner, or any other person and/or group of people who should receive information related to the process control system. Such an alert may enable the administrator of the process control system to take precautionary measures. The alert may allow the provider of the process control system to identify when a customer has attempted to modify the process control system to, for example, gain access to a paid feature. In addition to and/or as an alternative to sending alerts, the integrity guard may display warnings to the administrator, end illegitimate processes, shut down systems or services, perform security validations, etc.

FIG. 1 is a block diagram 100 of an example process control system 110 including one or more process control nodes 115. In some examples, the process control system 110 operates a power plant, an oil refinery, a chemical facility, etc.

Example process control systems, like the process control system 110 of FIG. 1, typically include one or more process control nodes 115 having field devices communicatively coupled to the process control nodes 115 via analog, digital or combined analog/digital buses. The field devices, which may be, for example, valves, valve positioners, switches and transmitters (e.g., temperature, pressure and flow rate sensors), perform process control functions within the process control system 110 such as opening or closing valves and measuring process control parameters. The process control nodes 115 receive signals indicative of process measurements made by the field devices, process this information to implement a control routine, and generate control signals that are sent within the process control system 110 to control the operation of the process. In this manner, the process control nodes 115 may execute and coordinate control strategies using the field devices via the buses and/or other communication links communicatively coupling the field devices. In some examples, the process control nodes 115 communicate with resources outside of the process control system 110 to, for example, provide alerts and/or warnings, retrieve parameters to be used within the process control system 110, etc.

The process control system 110 of the illustrated example is provided to the operator of the process control system 110 by a process control system provider 120. The process control system provider 120 communicates with the process control system 110 to, for example, receive alerts, provide updates to the process control system 110, ensure proper licensing, etc. In the illustrated example, the process control system provider 120 communicates with the process control system 110 via the Internet 125. However, any other type of communication medium may additionally or alternatively be used such as, for example, a virtual private network (VPN), a dial up connection, etc.

In the illustrated example, the process control system 110 is administered by a process control system administrator 130. As described herein, the process control system administrator 130 may be any person and/or group of people associated with and/or otherwise concerned with the process control system 110. For example, the process control system administrator 130 may be an operator, an installer, a manager, a user, an owner, or any other person and/or group of people who should receive information related to the process control system 110. The process control system administrator 130 of the illustrated example operates and/or maintains the process control system 110. In some examples, the process control system administrator 130 deploys and/or configures the process control system 110. Because the process control system administrator 130 is involved with configuration of the process control system 110, the process control system administrator 130 may, inadvertently or otherwise, activate and/or install functionalities that are otherwise paid for. In some examples, the process control system 110 alerts the process control system administrator 130 when features and/or functionalities that have not been purchased are in operation. Conversely, the process control system 110 may alert the process control system administrator 130 when features and/or functionalities that have been purchased are not installed, configured, and/or operating properly.

Figure 2:
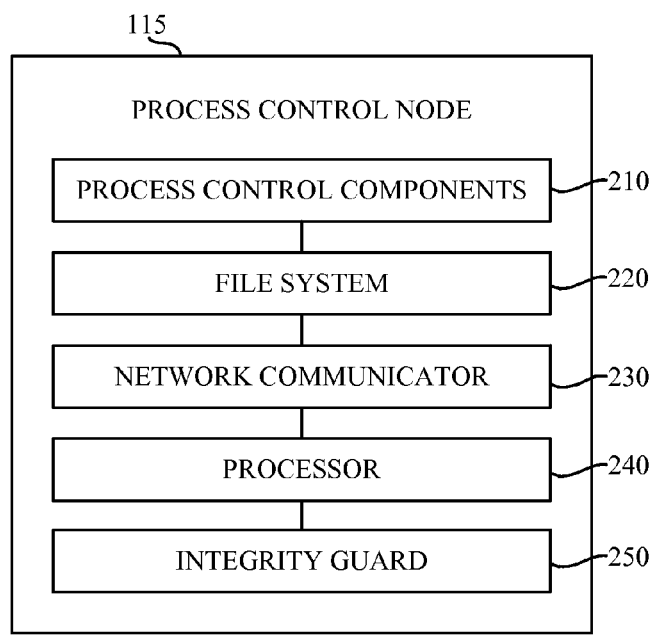
FIG. 2 is a block diagram of an example implementation of the process control nodes of FIG. 1 including an integrity guard.

FIG. 2 is a block diagram of an example implementation of the process control node 115 of FIG. 1. The example node 115 includes process control components 210, a file system 220, a network communicator 230, a processor 240, and an integrity guard 250.

The example process control components 210 of the illustrated example of FIG. 2 include input devices capable of receiving inputs to control a process via, for example, valves, pumps, fans, heaters, coolers, and/or other devices. The example process control node 210 also includes output devices capable of generating outputs such as, for example, thermometers, pressure gauges, flow meters, and/or other devices. In some examples, the process control components 210 are communicatively coupled to a controller (e.g., a DeltaV™ controller), which collects information output by the output devices and transmits instructions to the input devices to cause changes to the process. The information used by the process control components 210 includes, for example, process information, environmental information, and values of process variables (e.g., measured process variables such as, for example, reactor inlet pressure).

The example file system 220 of the illustrated example of FIG. 2 stores information for operating the process control components 210 and/or, more generally, the process control node 115. In the illustrated example, the file system 220 is implemented via a hard disk drive. However, the file system 220 may be any device for storing data such as, for example, flash memory, magnetic media, etc. Furthermore, the data stored in the file system 220 may be in any data format such as, for example, a New Technology File System (NTFS), File Allocation Table (FAT), etc.

The example network communicator 230 of the illustrated example of FIG. 2 is an Ethernet interface. In the illustrated example, the network communicator 230 receives network communications (e.g., HTTP requests, etc.) from and/or transmits network communications to other process control nodes 115 within the process control system 110 and/or other devices outside of the process control system 110 (e.g., devices on the Internet 125, etc.). While in the illustrated example, the network communicator 230 is an Ethernet interface, any other type of interface may additionally or alternatively be used. For example, the network communicator 230 may include one or more of a Bluetooth interface, a WiFi interface, a digital subscriber line (DSL) interface, a T1 interface, etc. While in the illustrated example a single network communicator 230 is shown, any number and/or type(s) of network communicators may additionally or alternatively be used. For example, two network communicators (e.g., Ethernet interfaces) may be used.

The example processor 240 of the illustrated example of FIG. 2 processes information to operate the process control node 115. The example processor 240 of FIG. 2 is implemented by a processor executing instructions but could, alternatively, be implemented by an Application Specific Integrated Circuit (ASIC), Digital Signal Processor (DSP), Field Programmable Gate Array (FPGA), or other circuitry. In the illustrated example, the processor 240 processes information based on machine-readable instructions stored in the file system 220. However, the instructions may be stored in any other location such as, for example, a memory, an Internet resource, etc. In the event of a degradation of integrity of the process control node 115 (e.g., a security breach, etc.), the instructions may be modified such that when the processor 240 executes the instructions, the process control node 115 may not function as intended.

The example integrity guard 250 of the illustrated example of FIG. 2 monitors and verifies the integrity of the process control node 115 and, thereby, the process control system 110. The integrity of the process control node 115 is monitored in a number of ways including, for example, monitoring and verifying the file system 220 of the process control node 115, monitoring and verifying network communications to and/or from the network communicator 230 of the process control node 115, and/or monitoring and verifying active processes being executed by the processor 240 of the process control node 115.

Figure 3:
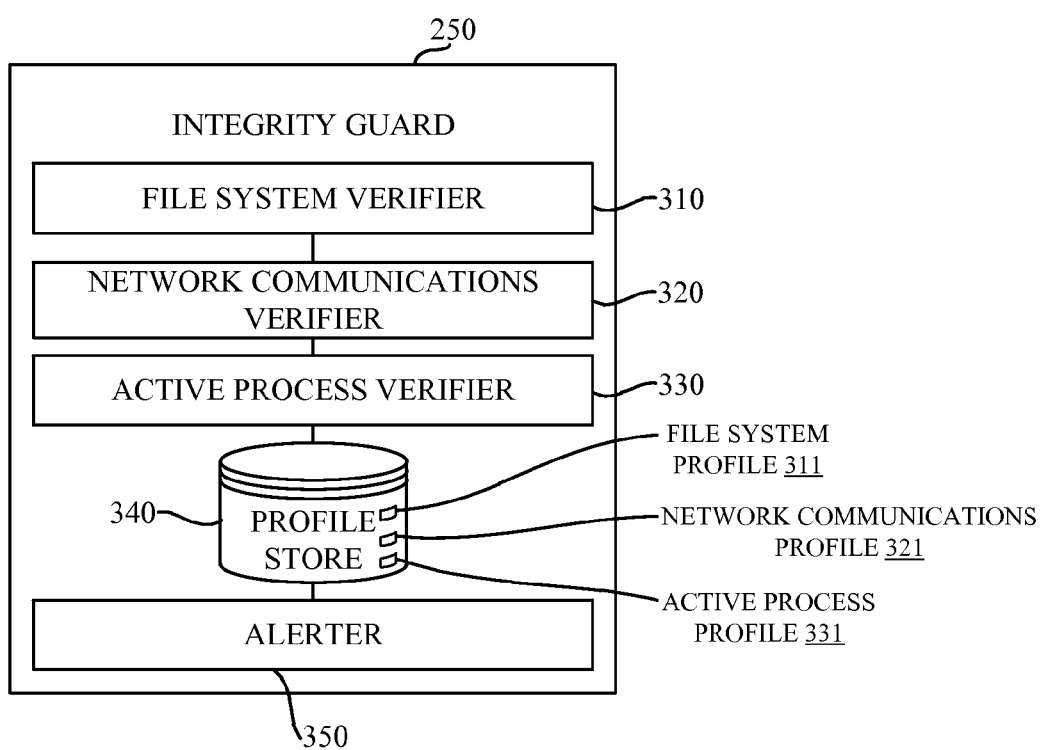
FIG. 3 is a block diagram of an example implementation of the integrity guard of the example process control nodes of FIGS. 1 and 2.

FIG. 3 is a block diagram of an example implementation of the integrity guard 250 of the example process control node 115 of FIGS. 1 and 2. The example integrity guard 250 includes a file system verifier 310, a network communications verifier 320, an active process verifier 330, a profile store 340, and an alerter 350. The example profile store 340 includes a file system profile 311, a network communications profile 321, and an active process profile 331. While in the illustrated example, the file system profile 311, the network communications profile 321, and the active process profile 331 are shown as separate profiles, the file system profile 311, the network communications profile 321, and the active process profile 331 may be combined and/or arranged into a single profile (e.g., a system profile).

The example file system verifier 310 is implemented by a processor executing instructions but could, alternatively, be implemented by an ASIC, DSP, FPGA, or other circuitry. In the illustrated example, the file system verifier 310 monitors and/or verifies the integrity of the file system 220. In the illustrated example, the file system verifier 310 verifies the integrity of the file system 220 by checking files on the file system 220 against a file system profile 311 stored in the profile store 340. In some examples, the file system verifier 310 computes a hash value of a file on the file system 220 and determines if the computed hash value matches a previously calculated hash value of the file stored in the file system profile 311. In the illustrated example, the hash value is calculated using a hashing algorithm (e.g., Secure Hash Algorithm 1 (SHA-1), Message Digest 5 (MD5), etc.) If the computed hash value matches the previously calculated hash value, the file is unchanged. However, if the computed hash value does not match the previously calculated hash value, the file has been modified. Modifications to particular files of the process control system may indicate a degradation of integrity of the process control node 115.

In some examples, the file system profile 311 contains exceptions for certain files and/or directories of files. For example, the file system profile 311 may contain an exception for a log file and/or a log file directory (e.g., a location where one or more log file(s) may be stored) so that log activity is not identified as a degradation in integrity of the process control node 115. If the file system verifier 310 identifies degradation(s) in integrity of the file system 220 of the process control node 115, the file system verifier 310 alerts the process control system administrator 130 and/or the process control system provider 120 via the alerter 350. In some examples, the file system verifier 310 takes action to remove (e.g., delete, quarantine, etc.) files that have resulted in the degradation of integrity of the process control node 115.

The file system verifier 310 of the illustrated example identifies degradations in integrity of the process control node 115 by identifying items (e.g., files, directories of files, etc.) that do not match a profile of a known system. Conversely, known anti-virus systems identify malicious files by matching a definition of known problems. For example, whereas an anti-virus system would scan the file system to identify whether a file associated with a particular virus is present, the example file system verifier 310 identifies when any file not included in the file system profile is present.

The example network communications verifier 320 is implemented by a processor executing instructions but could, alternatively, be implemented by an ASIC, DSP, FPGA, or other circuitry. In the illustrated example, the network communications verifier 320 monitors and verifies network communications to and/or from the network communicator 230 by identifying properties of the network communications. In the illustrated example, one or more properties of valid communications are stored in a network communications profile 321. The network communications profile 321 of the illustrated example is stored in the profile store 340.

In the illustrated example, the network communications profile 321 includes properties identifying port numbers that are normally used by the process control node 115. When an attempt to use a port not normally used by the process control node 115 is detected, the example network communications verifier 320 identifies this attempt as a degradation of integrity of the process control node 115. Additionally or alternatively, the network communications profile 321 may include other parameters as part of the signature(s). For example, the signature may include destination addresses (e.g., an Internet Protocol (IP) address, a domain name, an email address, etc.) used by the process control node 115, message formats used by the process control node 115, etc.

In some examples, the network communications verifier 320 determines if network communications are indicative of degradation(s) of integrity when network communications directed toward a destination not included in the network communications profile 321 are transmitted. In some examples, the network communications verifier 320 uses a challenge/response mechanism to interrogate processes of the process control node 115 transmitting network communications.

If the network communications verifier 320 detects a degradation(s) of integrity of the process control node 115, the network communications verifier 320 alerts the process control system administrator 130 and/or the process control system provider 120 via the alerter 350. In some examples, the network communications verifier 320 blocks the network communication(s), logs the network communication(s), etc.

The example active process verifier 330 is implemented by a processor executing instructions but could, alternatively, be implemented by an ASIC, DSP, FPGA, or other circuitry. In the illustrated example, the active process verifier 330 monitors and/or verifies active processes being executed by the processor 240. In the illustrated example, processes are monitored and/or verified based on the active process profile 331. However, any other manner of identifying processes may additionally or alternatively be used.

In the illustrated example, the active process profile 331 includes signatures identifying processes (e.g., process names, Dynamically Linked Libraries (DLLs) used by a process, etc.) that are normally used by the process control node 115. In the illustrated example, active processes are identified when the active process verifier 330 interacts with an operating system of the process control node 115. In some examples, active processes are identified as having loaded one or more DLLs. The active process verifier 330 verifies each process identified by the operating system of the process control node 115 against the active process profile 331. Processes are checked to determine, for example, whether they are loaded from a particular location on the file system 220, whether a particular DLL is loaded by the process, whether a file (e.g., an executable, a DLL, a configuration file) has a computed hash value that matches a hash value stored in the active process profile 331, etc. When a process is discovered that does not match a signature of a known process, the active process verifier 330 performs an action such as, for example, terminating the process, shutting down the process control node 115, logging a termination of the process, alerting the process control system administrator 130 and/or the process control system provider 120 via the alerter 350, etc.

The profile store 340 of the illustrated example stores profiles related to verified configurations of file systems, verified network communications, verified active processes, and/or results of previous verifications. The profile store 340 may be any device for storing data such as, for example, flash memory, magnetic media, optical media, etc. Furthermore, the data stored in the profile store 340 may be in any data format such as, for example, binary data, comma delimited data, tab delimited data, structured query language (SQL) structures, etc. While, in the illustrated example, the profile store 340 is illustrated as a single database, the profile store 340 may be implemented by any number and/or type(s) of databases.

In some process control systems, a given profile (e.g., the file system profile 311, the network communications profile 321, the active process profile 331, etc.) may not exist. Thus, in those systems the profile must be created and/or initialized. To initialize a profile, the integrity guard identifies files on the file system of the process control node 115 and computes hash values therefor. Of course, other methods of initializing a profile may additionally or alternatively be used such as, for example, identifying active processes being executed by the process control node 115, monitoring network communications of the process control node 115, etc. In the illustrated example, such a profile initialization is done at the time of installation of the process control node 115. Thus, the profile represents a snapshot of the process control node 115 at the time of profile initialization. However, in some examples, the profile initialization occurs at a later time such as, for example, after a configuration change, after installation of a third party application, etc. The initialized profiles are then stored in the profile store 340 for future use by the integrity guard 250.

In some examples, the profile store 340 and/or the profiles stored therein are synchronized with a remote profile (e.g., a profile stored on a remote profile server). In the illustrated example, the remote profile server (not shown) is a server within the process control system 110. However, in some examples, the remote profile server is hosted by the process control system provider 120 (e.g., via the Internet 125). For example, it may not be feasible to initialize profiles on every process control node. In some examples, the profile (e.g., the file system profile 311, the network communications profile 321, the active process profile 331, etc.) is retrieved from another process control node 115. Thus, the process control system administrator 130 and/or the process control system provider 120 may create an updated profile and use that profile on multiple process control nodes. In some examples, the profile is automatically updated and pushed to the appropriate nodes (e.g., process control nodes performing similar functionalities) to update the process control nodes.

In some examples, a third party application may need to be installed on the process control node 115, but appropriate modifications to the profile may not have been made at the time of installation. Accordingly, files, network communications, and/or processes associated with the application will likely be recognized as degradations of integrity. In some examples, an identifier is added to a log entry corresponding to the degradation of integrity associated with the newly installed application to enable auditing of the log entries for benign third party applications. In the illustrated example, the log is stored locally on the process control node 115 as a text based file. However, any other way of storing such information may additionally or alternatively be used such as, for example, a binary file, a database, a logging system (e.g., the Windows Event Log, etc.). Further, the log entries may be transmitted to a system as they occur via a remote logging protocol and/or system such as, for example, a syslog system, a Simple Network Monitoring Protocol (SNMP). Such logs may be transmitted to the process control system provider 120, which may then update the profile so that the third party application is appropriately identified as to whether it is a degradation of integrity.

The example alerter 350 is implemented by a processor executing instructions but could, alternatively, be implemented by an ASIC, DSP, FPGA, or other circuitry. In the illustrated example, the alerter 350 alerts the process control system administrator 130 and/or the process control system provider 120 of degradations of integrity of the process control node 115 and, more generally, the process control system 110. In the illustrated example, the alerter 350 alerts the process control system administrator 130 and/or the process control system provider 120 by displaying alert messages (e.g., displaying a dialog box on a computer display). Additionally or alternatively, the alerter 350 may alert the process control system administrator 130 and/or the process control system provider 120 in any other fashion such as, for example, an electronic mail (e-mail) message, a short message service (SMS) message, system alarms, etc.

While an example manner of implementing the integrity guard 250 of FIG. 2 has been illustrated in FIG. 3, one or more of the elements, processes and/or devices illustrated in FIG. 3 may be combined, divided, re-arranged, omitted, eliminated and/or implemented in any other way. Further, the example file system verifier 310, the example network communications verifier 320, the example active process verifier, the example profile store 340, the example alerter 350, and/or more generally the example integrity guard 250 of FIG. 3 may be implemented by hardware, software, firmware and/or any combination of hardware, software and/or firmware. Thus, for example, any of the example file system verifier 310, the example network communications verifier 320, the example active process verifier, the example profile store 340, the example alerter 350, and/or more generally the example integrity guard 250 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example file system verifier 310, the example network communications verifier 320, the example active process verifier, the example profile store 340, and/or the example alerter 350 are hereby expressly defined to include a tangible computer-readable medium such as a memory, DVD, CD, Blu-ray, etc. storing the software and/or firmware. Further still, the example integrity guard 250 of FIGS. 2 and/or 3 may include one or more elements, processes and/or devices in addition to, or instead of, those illustrated in FIG. 3, and/or may include more than one of any or all of the illustrated elements, processes and devices.

Flowcharts representative of example methods or processes for implementing the integrity guard 250 of FIGS. 2 and/or 3 are shown in FIGS. 4-7. In these examples, the processes may comprise a program(s) for execution by a processor such as the processor 812 shown in the example processor platform 800 discussed below in connection with FIG. 8. The program(s) may be embodied in software stored on a tangible computer readable medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-7, many other methods of implementing the example integrity guard 250 may alternatively be used. For example, the order of execution of the blocks may be changed, and/or some of the blocks described may be changed, eliminated, or combined.

As mentioned above, the example processes of FIGS. 4-7 may be implemented using coded instructions (e.g., computer-readable instructions) stored on a tangible computer-readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals.

Additionally or alternatively, the example processes of FIGS. 4-7 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 4:
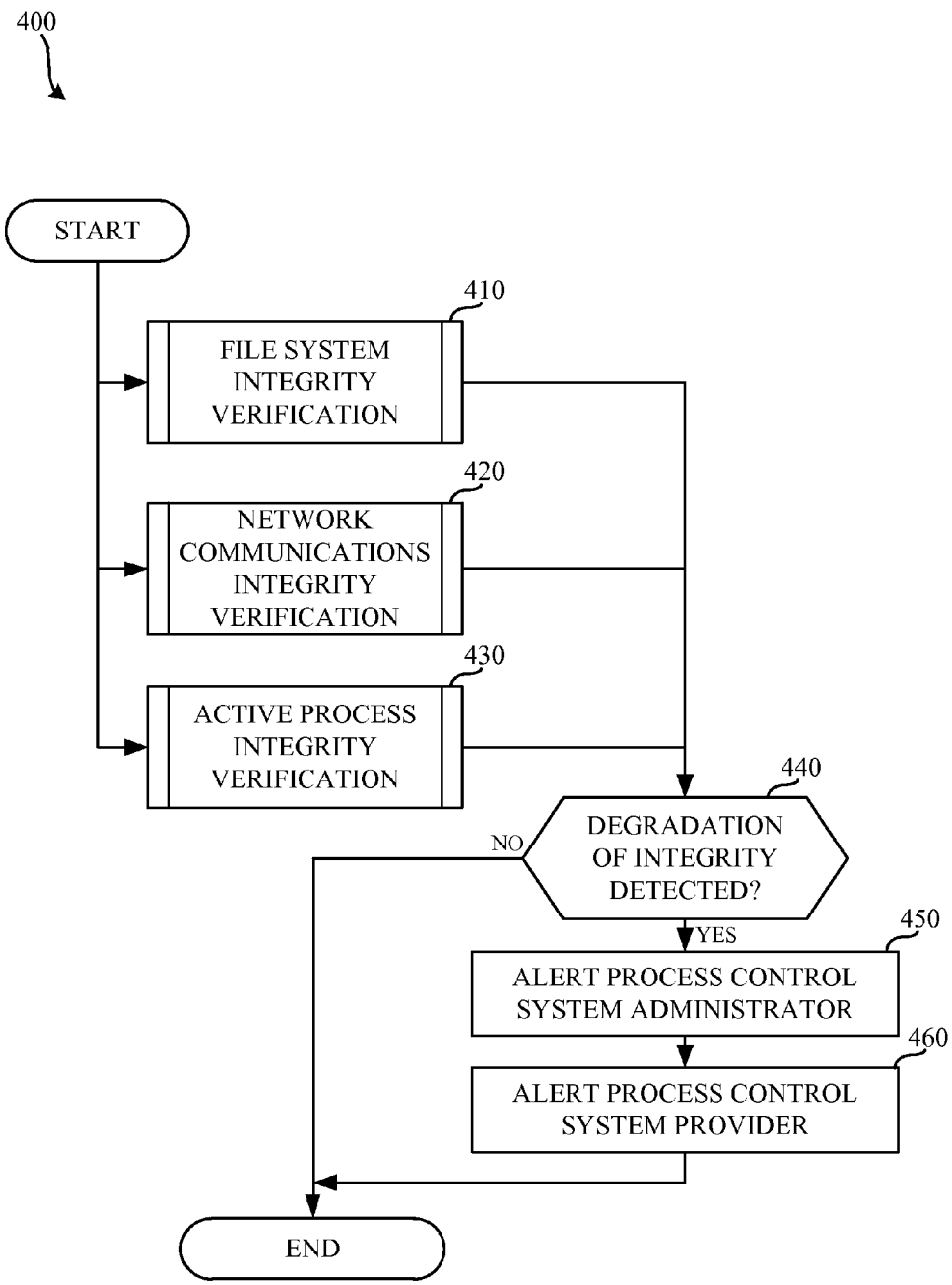
FIG. 4 is a flowchart representative of an example method which may be performed to detect a change in integrity of the process control system of FIG. 1.

FIG. 4 is a flowchart 400 representative of an example method which may be performed to detect a change in integrity of the process control system 110 of FIG. 1. Blocks 410, 420, and 430 of FIG. 4 represent sub-processes and execute in parallel to detect a change in integrity of the process control system 110.

In block 410, the example file system verifier 310 of the integrity guard 250 monitors and/or verifies the file system 220 of the process control node 115. The operations of the file system verifier 310 are further described in connection with FIG. 5. In block 420, the example network communications verifier 320 of the integrity guard 250 monitors and/or verifies network communications of the network communicator 230 of the process control node 115. The operations of the network communications verifier 320 are further described in connection with FIG. 6. In block 430, the example active process verifier 330 of the integrity guard 250 monitors and/or verifies active processes executed by the processor 240 of the process control node 115. The operations of the active process verifier 330 are further described in connection with FIG. 7.

As described above, blocks 410, 420, and 430 represent sub-processes, and are executed in parallel with one another. In the illustrated example, blocks 410, 420, and 430 are executed continuously. However, any other method of executing these sub-processes may additionally or alternatively be used. For example, blocks 410, 420, and 430 may be periodically executed to reduce the amount of system resources utilized (e.g., the monitoring and/or verifying process is executed once every five minutes, once every hour, once every day, etc.). Additionally or alternatively, these sub-processes may be executed using a combination of continuous execution and periodic execution. For example, the file system verifier 310 may monitor the file system 220 once every hour (block 410), the network communications verifier 320 may continuously monitor network communications of the network communicator 230 (block 420), and the active process verifier 330 may monitor and/or verify the active processes executed by the processor 240 once every five minutes (block 430). However, any other combination of periodic and/or continuous execution may additionally or alternatively be used.

In the illustrated example, a notification is transmitted to the alerter 350. The notification may inform the alerter 350 as to a status of the monitoring and/or verifying process. The notification may be used to identify detection of a degradation of integrity. The notification may be transmitted in any fashion such as, for example, network communications, inter-process communication, writing the notification to a file, termination of a process (e.g., block 410, 420, and/or 430) etc. Upon receiving the notification, the alerter 350 determines if a degradation of integrity has been detected (block 440). If there has been no degradation of integrity, control proceeds to terminate. As explained above, the process described in FIG. 4 may be repeated periodically and/or executed continuously.

If there has been a degradation of integrity, control proceeds to block 450 where the alerter 350 alerts the process control system administrator 130 of the degradation of integrity. In the illustrated example, the alerter 350 alerts the process control system administrator 130 by displaying an alert message (e.g., displaying a dialog box on a computer display) (block 450). In the illustrated example, the alerter 350 alerts the process control system provider 120 by displaying an alert message (e.g., displaying a dialog box on a computer display) (block 460). However, any other method of alerting the process control system administrator 130 and/or the process control system provider 120 may additionally or alternatively be used. For example, the alerter 350 may alert the process control system administrator 130 and/or the process control system provider 120 by, for example, sending an electronic mail (e-mail) message, sending a short message service (SMS) message, triggering system alarms, disabling the process control system 110, etc.

Figure 5:
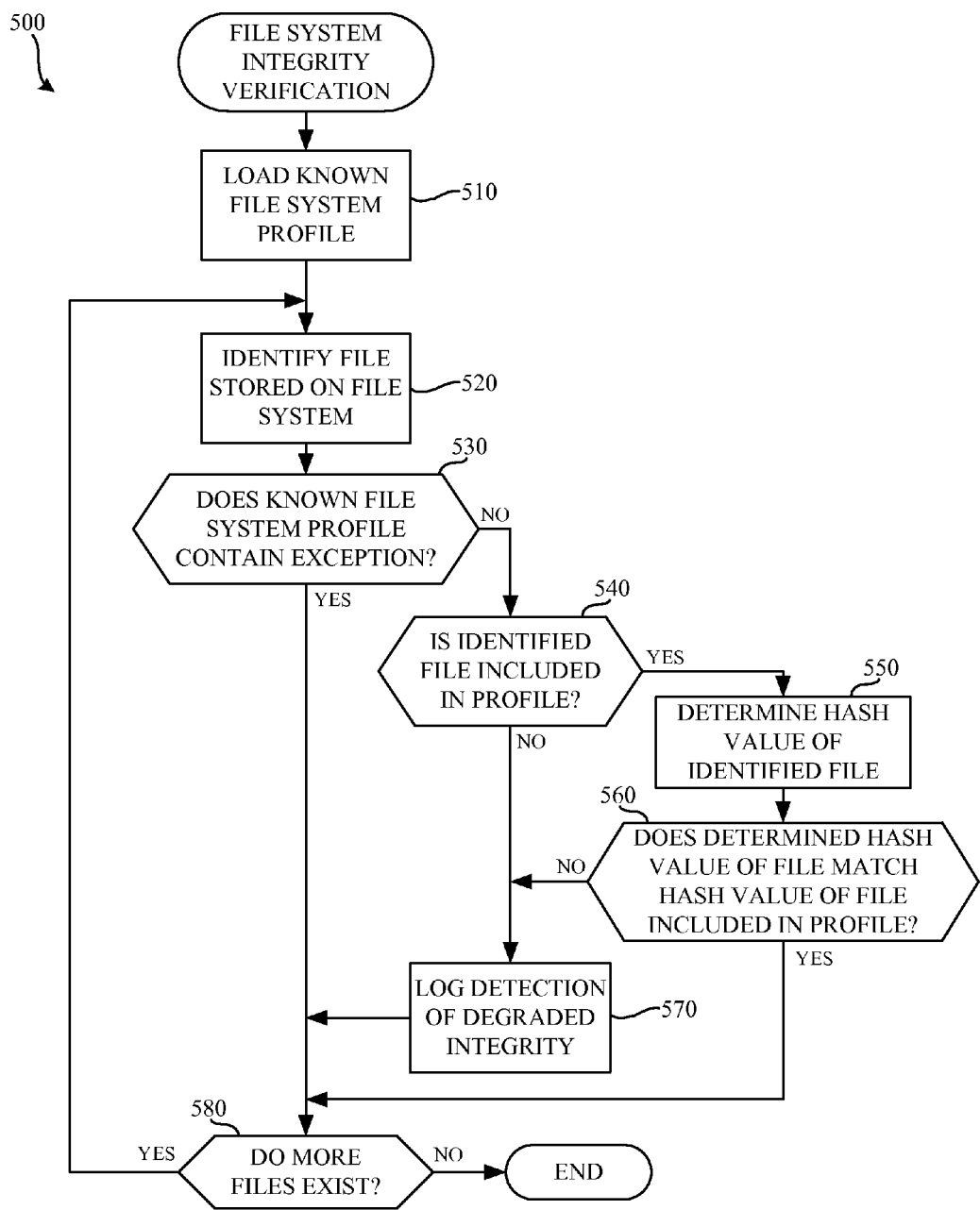
FIG. 5 is a flowchart representative of an example method which may perform a file system integrity verification.

FIG. 5 is a flowchart 500 representative of an example method which may perform a file system integrity verification.

The example method of FIG. 5 represents the sub-process described in block 410 of FIG. 4. The example method begins execution when the file system verifier 310 loads the file system profile 311 from the profile store 240 (block 510). The file system verifier 310 identifies individual files stored on the file system 220 (block 520). Files may be identified by, for example, interacting with an operating system of the process control node 115.

The file system verifier 310 determines if the identified file is identified as an exception within the file system profile 331 (block 530). The file may be an exception if, for example, the file is within a particular directory, the file is of a particular size, the file has a particular file extension (e.g., an image (.jpg), a text document (.txt), etc.). If the file is identified in the file system profile 331 as an exception, control proceeds to block 580 where it is determined if more files exist (block 580). If the file is not identified as an exception at block 530, control proceeds to block 540. The file system verifier 310 then determines if the file is included in the profile 331 (block 540). If the file is not included in the profile 331 the file system verifier 310 logs detection of the degradation of integrity (block 570). Detection of files not included in the profile and are not contained in an exception allows the file system verifier 310 to detect degradations of integrity when new files are present on the file system.

If the identified file is included in the profile at block 540, the file system verifier 310 determines (e.g., computes) a hash value of the identified file (block 550). The file system verifier 310 then determines if the computed hash value of the identified file matches the stored hash value corresponding to the file in the profile (block 560). The computed hash value may not match the stored hash value if, for example, the file has been modified. Comparing the hash values allows the file system verifier 310 to detect if a file has been changed. If the computed hash value does not match the stored hash value, the file system verifier 310 logs detection of the degradation of integrity (block 570). In the illustrated example, the file system verifier 310 logs the detection of the degradation of integrity by storing a log entry in a log local to the process control node 115. However, in some examples, the file system verifier 310 logs detection of the degradation of integrity by transmitting to log entry to a logging location (e.g., a logging server local to the process control system 110, a logging server remote to the process control system such as, for example, at the process control system provider, at a third party, etc.). In some examples, the log entries are transmitted using a remote logging protocol and/or system such as, for example, a syslog logging system, a Simple Network Management Protocol (SNMP), etc. If the computed hash value does match the stored hash value, the file system verifier 310 proceeds to determine whether there are more files to be verified (block 580). In the illustrated example, if no additional files are to be verified control proceeds to terminate the method of FIG. 5. The alerter 350 then receives a notification that the sub-process has completed. In some examples, the operations of FIG. 5 are repeated and/or continued such that the file system 220 is re-verified.

Figure 6:
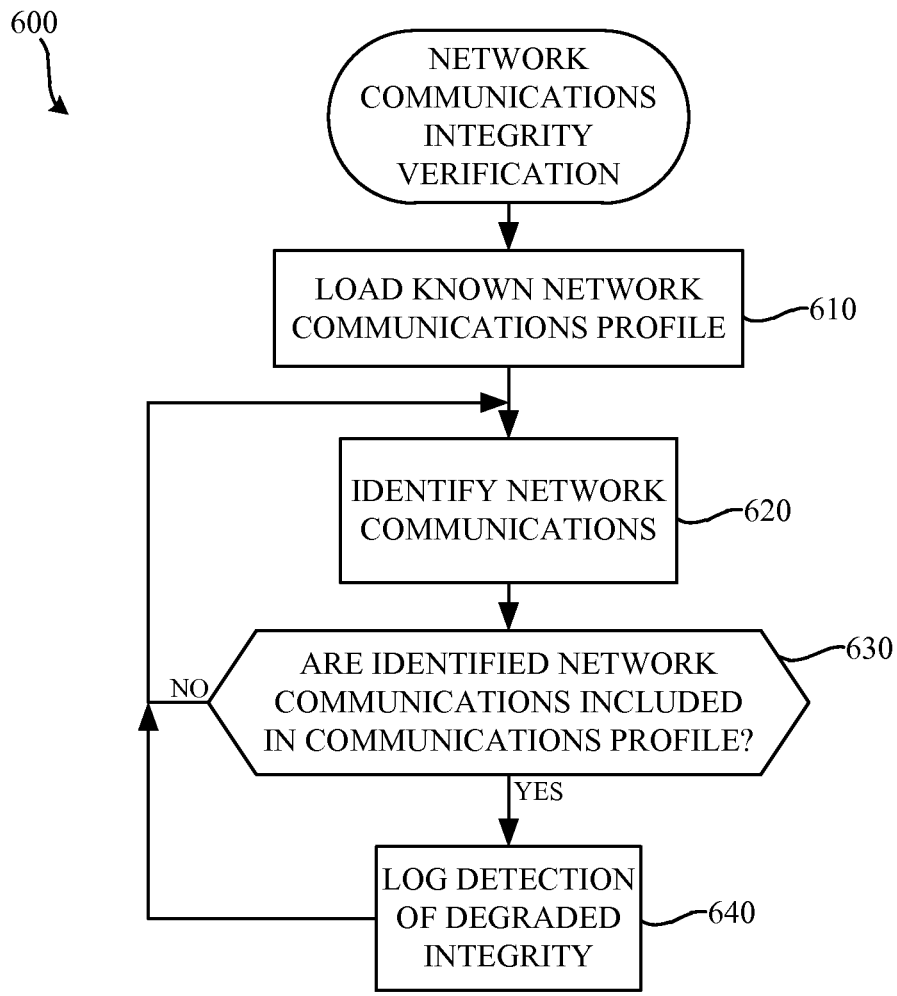
FIG. 6 is a flowchart representative of an example method which may perform a network traffic integrity verification.

FIG. 6 is a flowchart 600 representative of an example method to perform a network traffic communications verification. The example method of FIG. 6 represents the sub-process described in block 420 of FIG. 4.

The example method of FIG. 6 begins execution when the network communications verifier 320 loads the network communications profile 321 from the profile store 340 (block 610). The network communications verifier 320 identifies network communications of the network communicator 230 (block 620). The network communications verifier 320 then determines if the identified network communications are included in the network communications profile 321 (block 630). In the illustrated example, the network communications profile 321 includes port numbers (e.g., transmission control protocol (TCP) port numbers, etc.) that are normally used by the process control node 115. When an attempt to use a port not normally used by the process control node 115 is detected, the example network communications verifier 320 identifies this attempt as a degradation of integrity of the process control node 115. When a degradation of integrity of the process control node 115 is detected, control proceeds to block 640 where the network communications verifier 320 logs the detection of the degradation of integrity (block 640). In the illustrated example, the network communications verifier 320 logs the detection of the degradation of integrity by storing a log entry in a log local to the process control node 115. However, in some examples, the network communications verifier 320 logs detection of the degradation of integrity by transmitting to log entry to a logging location (e.g., a logging server local to the process control system 110, a logging server remote to the process control system such as, for example, at the process control system provider, at a third party, etc.). In some examples, the log entries are transmitted using a remote logging protocol and/or system such as, for example, a syslog logging system, a Simple Network Management Protocol (SNMP), etc.

In some examples, the network communications verifier 320 may verify the network communications based on other parameters such as, for example, a source and/or destination addresses (e.g., an Internet Protocol (IP) address, a domain name, an email address, etc.), a message format used by the process control node 115, content of the network communications, etc. If the network communications verifier 320 detects network communications matching network communications expected to be used by the process control node 115, control proceeds to block 620 where the network communications verifier 320 continues to monitor and verify network communications of the network communicator 230. As described above, the operations of FIG. 6 may be executed periodically and/or continuously. In the illustrated example, the method of FIG. 6 is executed continuously.

Figure 7:
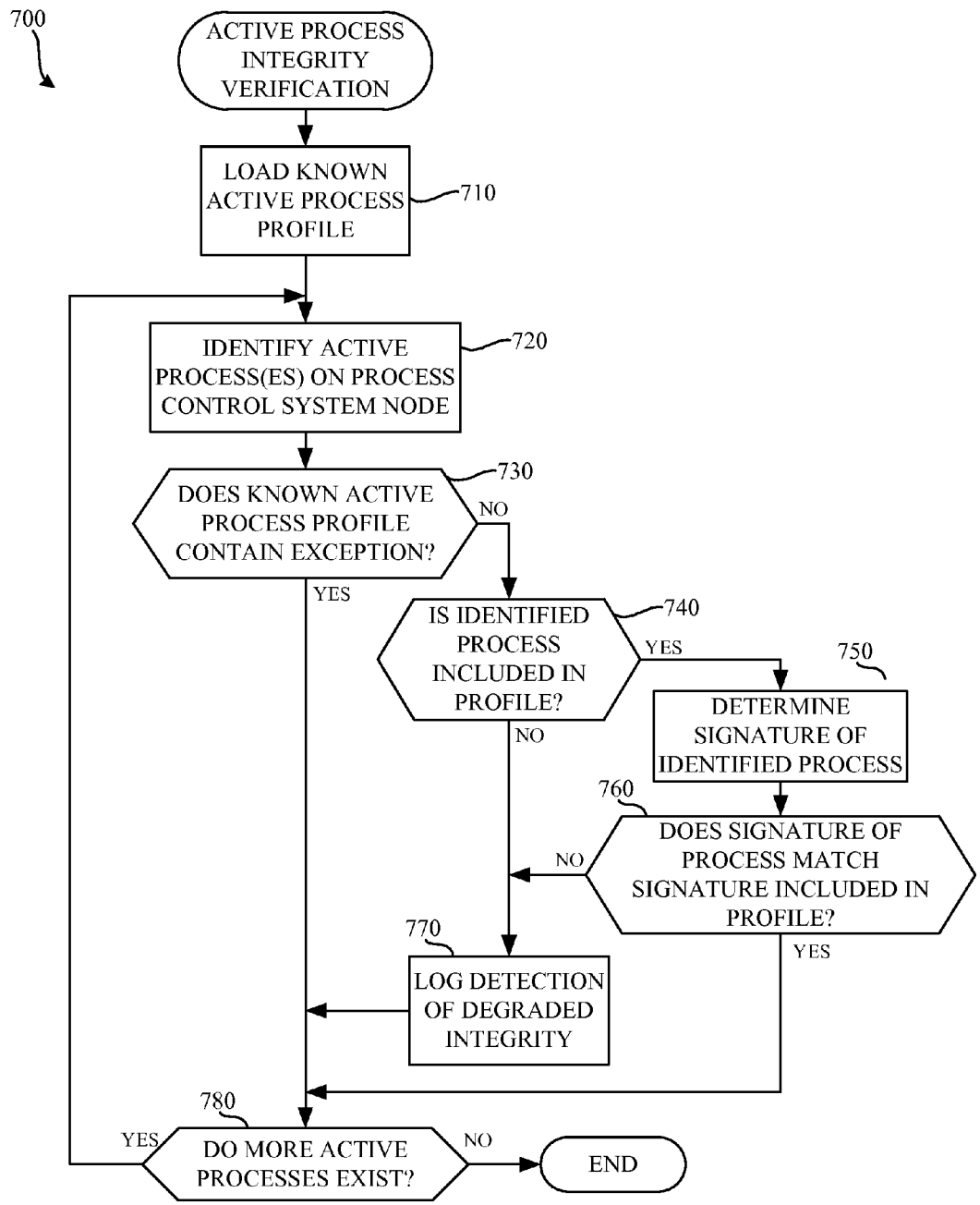
FIG. 7 is a flowchart representative of an example method which may perform an active process integrity verification.

FIG. 7 is a flowchart 700 representative of an example method to perform an active process integrity verification. The example method of FIG. 7 represents the sub-process described in block 430 of FIG. 4.

The example method of FIG. 7 begins execution when the active process verifier 330 loads the active process profile 331 from the profile store 240 (block 710). The active process verifier 330 then identifies active processes executed by the processor 240 (block 720). Active processes may be identified by, for example, interacting with an operating system of the process control node 115. The active process verifier 330 then determines if the identified process is identified as an exception within the active process profile 331 (block 730). The process may be an exception if, for example, the process was loaded from a particular directory, the process has a memory footprint of a particular size, etc. If the process is identified in the active process profile 331 as an exception, control proceeds to block 780 where it is determined if more active processes exist (block 780). If the process is not identified as an exception, control proceeds to block 740. The active process verifier 330 then determines if the process is included in the active process profile 331 (block 740). If the process is not included in the active process profile 331 the active process verifier 330 logs detection of the degradation of integrity (block 770). In the illustrated example, the file system verifier 310 logs the detection of the degradation of integrity by storing a log entry in a log local to the process control node 115. However, in some examples, the file system verifier 310 logs detection of the degradation of integrity by transmitting to log entry to a logging location (e.g., a logging server local to the process control system 110, a logging server remote to the process control system such as, for example, at the process control system provider, at a third party, etc.). In some examples, the log entries are transmitted using a remote logging protocol and/or system such as, for example, a syslog logging system, a Simple Network Management Protocol (SNMP), etc. Detection of processes that are not included in the profile and that are not contained in an exception allows the active process verifier 330 to detect degradations of integrity if new processes (e.g., unknown processes, rogue processes, third party processes, etc.) are being executed. If the identified process is included in the profile, the active process verifier 330 determines (e.g., computes) a hash value of a file associated with the process (e.g., an executable, a DLL, a configuration file, etc.) (block 750).

The active process verifier 330 determines if the computed hash value of the identified file matches the stored hash value corresponding to the identified file in the profile (block 760). The computed hash value may not match the stored hash value if, for example, the file associated with the process has been modified. Comparing the hash values allows the active process verifier 330 to detect if a process has been modified. If the computed hash value does not match the stored hash value, the active process verifier 330 logs detection of the degradation of integrity (block 770). In the illustrated example, the active process verifier 330 logs the detection of the degradation of integrity by storing a log entry in a log local to the process control node 115. However, in some examples, the active process verifier 310 logs detection of the degradation of integrity by transmitting to log entry to a logging location (e.g., a logging server local to the process control system 110, a logging server remote to the process control system such as, for example, at the process control system provider, at a third party, etc.). In some examples, the log entries are transmitted using a remote logging protocol and/or system such as, for example, a syslog logging system, a Simple Network Management Protocol (SNMP), etc. If the computed hash value does match the stored hash value, the active process verifier 330 proceeds to determine whether there are more processes to be verified (block 780). In the illustrated example, if no additional processes are to be validated, control proceeds to terminate the machine-readable instructions of FIG. 7. The alerter 350 then receives a notification that the sub-process has completed. In some examples, the machine-readable instructions of FIG. 7 are repeated and/or continued such that the active processes are re-verified.

Figure 8:
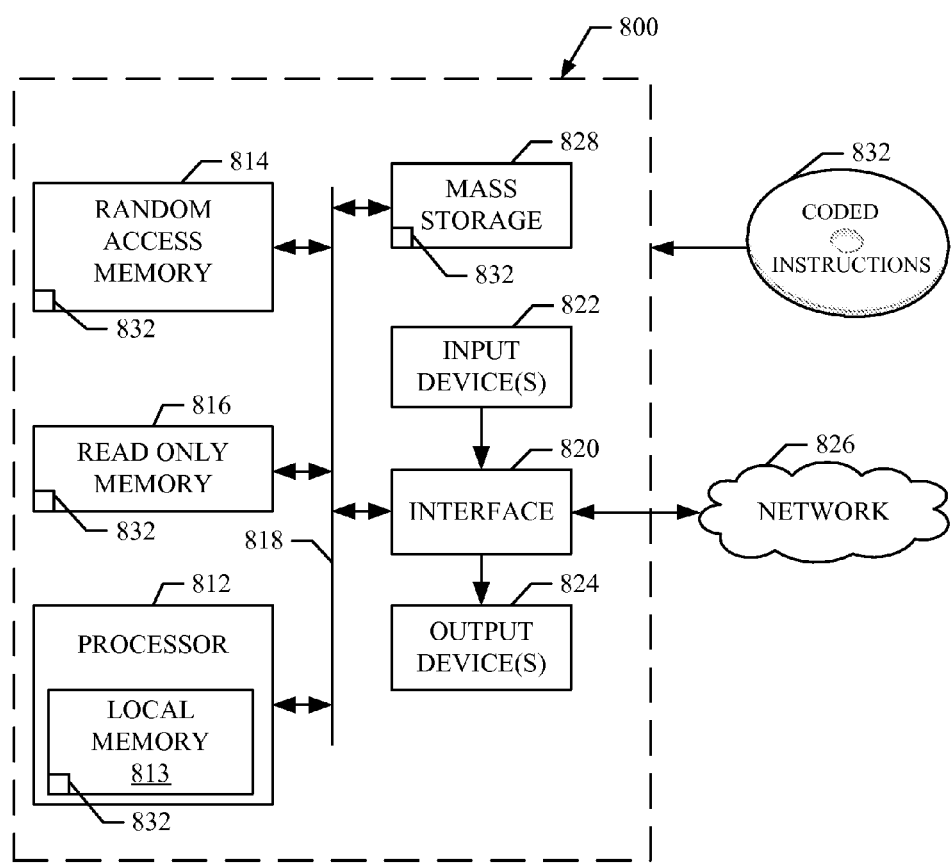
FIG. 8 is a block diagram of an example processor platform capable of performing the example methods of FIGS. 4-7 to implement the example process control nodes of FIGS. 1 and/or 2, and/or the example integrity guard of FIGS. 2 and/or 3.

FIG. 8 is a block diagram of an example processor platform 800 capable of executing the example methods of FIGS. 4-7 to implement the example process control node of FIGS. 1 and/or 2, and/or the example integrity guard of FIGS. 2 and/or 3. The example processor platform 800 can be, for example, a server, a personal computer, a mobile phone (e.g., a cell phone), a personal digital assistant (PDA), an Internet appliance, or any other type of computing device.

The system 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device (e.g., the network communicator 230) such as a modem or network interface card to facilitate exchange of data with external computers via a network 826 (e.g., an Ethernet connection, a digital subscriber line (DSL), a telephone line, coaxial cable, a cellular telephone system, etc.).

The processor platform 800 also includes one or more mass storage devices 828 for storing software and data. Examples of such mass storage devices 828 include floppy disk drives, hard drive disks, compact disk drives and digital versatile disk (DVD) drives. The mass storage device 828 may implement the file system 220 and/or the profile store.

Coded instructions 832 to implement the methods of FIGS. 4-7 may be stored in the mass storage device 828, in the local memory 813, in the volatile memory 814, in the non-volatile memory 816, and/or on a removable storage medium such as a CD or DVD.

From the foregoing, it will be appreciated that the above disclosed methods, apparatus and articles of manufacture provide the ability to detect a change (e.g., a degradation) in integrity of a process control system.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to identify a degradation of integrity of a process control system, the method comprising:
monitoring, with a processor, a file on a file system of the process control system;
verifying, with the processor, if the file is identified in a system profile, the system profile identifying files expected to be present on the file system;
identifying, with the processor, a degradation of integrity of the process control system when the file is not identified in the system profile;
alerting a process control system provider when the degradation of integrity is identified to indicate that a process control system administrator has attempted to modify the process control system, the process control system provider to supply the process control system to the process control system administrator; and
terminating an illegitimate process associated with the file identified in the system profile when the degradation of integrity is identified.

2. The method described in claim 1, further comprising:
comparing the file to a value associated with the file in the system profile when the file is included in the system profile to determine whether the file matches the value; and identifying the degradation of integrity of the process control system when the file is included in the system profile and when the file does not match the value.

3. The method as described in claim 1, further comprising alerting the process control system administrator when the degradation of integrity is identified.

4. The method as described in claim 1, wherein the degradation of integrity is not identified when the file is identified as an exception to the system profile.

5. The method as described in claim 1, further comprising initializing the system profile, wherein initializing the system profile comprises:
   identifying the file on the file system;
   computing a value associated with the file; and
   storing the value in the system profile.

6. The method as described in claim 1, further comprising retrieving the system profile from a remote profile server.

7. The method as described in claim 1, further comprising:
   identifying a process being executed by a processor of the process control system; and
   wherein the file identified on the file system is associated with the process being executed by the processor.

8. The method as described in claim 1, further comprising:
   identifying network communications of a network communicator of the process control system;
   comparing a property of the network communications to a stored property of the system profile; and
   identifying the degradation of integrity of the process control system when the property of the network communications does not match the stored property of the system profile.

9. A method to identify a degradation of integrity of a process control system, the method comprising:
   identifying, with a processor, a file on a file system of the process control system;
   computing a hash value of the file;
   comparing the computed hash value to a value associated with the file in a system profile, wherein the value associated with the file in the system profile is a previously computed hash value;
   identifying, with the processor, a degradation of integrity of the process control system when the computed hash value does not match the value associated with the file;
   alerting a process control system provider when the degradation of integrity is identified to indicate that a process control system administrator has attempted to modify the process control system, the process control system provider to supply the process control system to the process control system administrator; and
   terminating an illegitimate process associated with the file when the degradation of integrity is identified.

10. An apparatus to identify a degradation of integrity of a process control system, the apparatus comprising:
    a file system verifier to monitor a difference between a property of a file stored on a file system of a process control node and a first stored value as a degradation of integrity;
    an active process verifier to identify a difference between a property of an active process executed by the process control node and a second stored value as the degradation of integrity; and
    an alerter to alert a process control system provider when the degradation of integrity is identified to indicate that a customer has attempted to modify the process control system, the alerter to terminate an illegitimate process associated with the file when the degradation of integrity is identified, the process control system provider to provide the process control system to a process control system administrator of the process control system, wherein at least one of the file system verifier, the active process verifier, or the alerter is implemented by hardware.

11. The apparatus as described in claim 10, wherein the alerter is to alert the process control system administrator when the degradation of integrity is identified.

12. The apparatus as described in claim 10, wherein the first stored value is a hash value, and the property of the file is a computed hash value.

13. The apparatus as described in claim 10, wherein the property of the active process is a computed hash value of a file associated with the process.

14. The apparatus as described in claim 11, wherein the alerter is to alert at least one of the process control system provider or the process control system administrator by sending an email message.

15. The apparatus as described in claim 10, further comprising a network communications verifier to detect a difference between a property of monitored network communications of a network communicator of the process control node and a third stored value as the degradation.

16. A tangible computer-readable storage disk or storage device storing instructions which, when executed, cause a machine to at least:
    monitor a file on a file system of a process control system;
    verify whether the file is identified in a system profile, the system profile identifying files expected to be present on the file system;
    identify a degradation of integrity of the process control system when the file is not identified in the system profile;
    alert a process control system provider when the degradation of integrity is identified to indicate that a process control system administrator has attempted to modify the process control system, the process control system provider to supply the process control system to the process control system administrator; and
    terminate an illegitimate process associated with the file when the degradation of integrity is identified.

17. The computer-readable storage disk or storage device as described in claim 16, further storing instructions which, when executed, cause the machine to at least:
    compare the file to a value associated with the file in the system profile when the file is included in the system profile to determine whether the file matches the value; and
    identify the degradation of integrity of the process control system when the file is included in the system profile and when the file does not match the value.

18. The computer-readable storage disk or storage device as described in claim 16, further storing instructions which, when executed, cause the machine to at least:
    identify a process being executed by a processor of the process control system; and
    wherein the file identified on the file system is associated with the process being executed by the processor.

19. The computer-readable storage disk or storage device as described in claim 16, further storing instructions which, when executed, cause the machine to at least:
    identify network communications of a network communicator of the process control system;
    compare a property of the network communications to a stored property of the system profile; and identify the degradation of integrity of the process control system when the property of the network communications does not match the stored property of the system profile.

20. A tangible computer-readable storage disk or storage device storing instructions which, when executed, cause a machine to at least:

identify a file on a file system of a process control system;

compute a hash value of the file;

compare the computed hash value to a value associated with the file in a system profile, wherein the value associated with the file in the system profile is a previously computed hash value;

identify a degradation of integrity of the process control system when the computed hash value does not match the value associated with the file;

alert a process control system provider when the degradation of integrity is identified to indicate that a process control system administrator has attempted to modify the process control system, the process control system provider to supply the process control system to the process control system administrator; and terminate an illegitimate process associated with the file when the degradation of integrity is identified.

21. A method to identify a degradation of integrity of a process control system, the method comprising:

monitoring, with a processor, a file on a file system of the process control system, the process control system to control at least one of industrial or utility service facilities;

verifying, with the processor, if the file is identified in a system profile, the system profile identifying files expected to be present on the file system;

identifying, with the processor, a degradation of integrity of the process control system when the file is not identified in the system profile;

alerting a process control system provider when the degradation of integrity is identified to indicate that a customer operator has modified the process control system, the process control system provider to configure and supply the process control system to the customer operator; and terminating an illegitimate process associated with the file when the degradation of integrity is identified.

* * * * *